United States Patent [19]
Roth

[11] Patent Number: 4,580,034
[45] Date of Patent: Apr. 1, 1986

[54] WIRING SYSTEM FOR ELECTRICALLY OPERATED DEVICES COMPRISING HEATING RESISTANCES

[76] Inventor: Moshe Roth, 54 Herzl St., Nahariya, Israel

[21] Appl. No.: 558,704

[22] Filed: Dec. 6, 1983

Related U.S. Application Data

[63] Continuation of Ser. No. 279,224, Jun. 30, 1981.

[30] Foreign Application Priority Data

Jul. 17, 1980 [IL] Israel .......................................... 60615

[51] Int. Cl.[4] ............................................... H05B 1/02
[52] U.S. Cl. ..................................... 219/327; 219/453; 219/506
[58] Field of Search ............... 219/327, 328, 334, 453, 219/489, 506, 329, 331; 340/116, 117, 603, 584, 593, 655

[56] References Cited

U.S. PATENT DOCUMENTS

| | | | |
|---|---|---|---|
| 1,314,671 | 9/1919 | Koehler | 219/506 |
| 2,427,444 | 9/1947 | Colombo | 219/489 |
| 3,610,878 | 10/1971 | Thomas | 219/506 |
| 4,029,940 | 6/1977 | Eaton | 219/506 |
| 4,267,432 | 5/1981 | Kiepe | 219/328 |

FOREIGN PATENT DOCUMENTS

| | | | |
|---|---|---|---|
| 1126086 | 3/1962 | Fed. Rep. of Germany | 219/506 |
| 2938257 | 4/1981 | Fed. Rep. of Germany | 219/506 |
| 605378 | 7/1948 | United Kingdom | 219/506 |
| 2069778 | 8/1981 | United Kingdom | 219/506 |

*Primary Examiner*—M. H. Paschall
*Assistant Examiner*—Teresa J. Walberg
*Attorney, Agent, or Firm*—Toren, McGeady, Stanger, Goldberg & Kiel

[57] ABSTRACT

In the disclosed heater device, a thermostatic control is connected in series with a heating resistance across two power junctions. An incandescent lamp and a glow lamp are connected in series between the junctions while the common point between the lamps is connected to the common point between the switch and the resistance. When the thermostatic switch opens in response to heat it turns on the glow lamp; when it closes it turns on the incandescent lamp.

1 Claim, 3 Drawing Figures

WIRING SYSTEM FOR ELECTRICALLY OPERATED DEVICES COMPRISING HEATING RESISTANCES

This application is a continuation of Ser. No. 279,224 filed 6-30-81.

BACKGROUND OF INVENTION

The present invention relates to a wiring system for electrically controlled devices, such as domestic cooling apparatus, flat irons, grillers and so on, and particularly for water heaters which are also connected to a solar system, and more particularly to the visual indication of their positive performance and/or their temperature. It is well known to provide a small incandescent lamp, usually a red one, connected to the circuit in such a manner that, by its glowing, it indicates that the device is under current, e.g. the thermostatic switch thereof, if any, is in closed position. When the circuit is broken, either automatically by the thermostat, or manually by an exterior switch, it stops glowing, announcing the breaking of the circuit.

STATE OF ART

The above arrangement, although in general use, has obvious drawbacks. The lamp being out of order, which may happen quite frequently, there is no visual indication whether the circuit is closed or not. Furthermore, the lamp by its glowing does not indicate whether the device, e.g. a heating resistance, is acutally working, it only indicates that the switching operation has been performed. Further, the above mentioned arrangement does not indicate temperature of the water, e.g. in an electrically heated boiler which in addition is connected to a solar collector of known kind. In such a case there might be a sufficient supply of hot water in the boiler, the electrical heating resistance need not be switched on, but there would not be—in the conventional systems—any indication of that fact.

SHORT SUMMARY OF DISCLOSURE

To remedy this, there is provided a wiring system for an electrical device including a heating resistance and having a thermostatic control or time switch in series with the said resistance and including also two optical signals, one being an incandescent lamp and the second a gas filled fluorescent glow lamp and being arranged and positioned in the circuit feeding that device in such a manner that one terminal of the incandescent lamp is directly connected to the said resistance and from the same terminal of the incandescent lamp a connection is led to one terminal of the glow lamp, while the second terminal of the incandescent lamp is connected to "zero or phase" from which respective terminal a connection is led—via a switch, if desired—to the resistance while the second terminal of the glow lamp is connected to "phase or zero" and the latter respective terminal to the thermostatic switch.

SHORT DESCRIPTION OF DRAWINGS

The invention will now be described with reference to the attached drawing which in FIGS. 1 and 2 illustrate two positions of the new wiring system.

FIG. 3 illustrates schematically a further development of the new system.

DESCRIPTION OF PREFERRED EMBODIMENT

Figure 1:
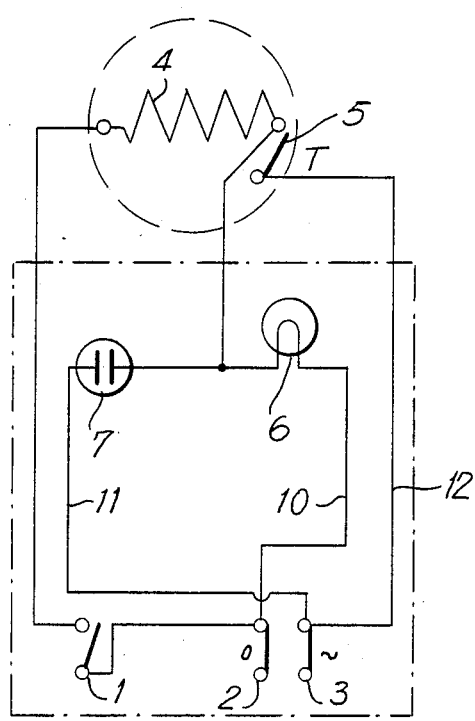

The new system is connected to the electrical grid via a manually operated switch 1 with terminals 2 being "zero" and 3 being "phase". There are further provided the heating resistance 4 and thermostatic switch 5 which controls flow of current to the resistance 4. Finally there are inserted in the wiring system a signalling lamp 6 which may be an ordinary small incandescent bulb and a glow lamp 7.

Assuming that the above wiring system is intended for a hot water boiler and assuming that hot water is available in the boiler, say—having been heated by electric current or by the solar collector—the switch 5 would be in "open" position (the manually operated switch may be either in "make" or "break" position). In that case current flows from terminal 2 via a wire 10 to lamp 6 and from there to glow lamp 7, which by conduit 11 is connected to terminal 3 (phase). It should be observed that although current passes lamp 6, this does not light up, since the voltage across it is not high enough. On the other hand, the glow lamp 7 lights up, indicating the fact that there is hot water in the boiler.

Figure 2:
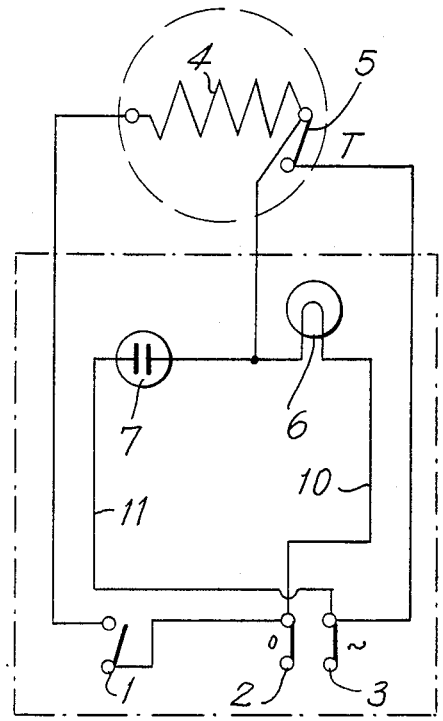

In the position of FIG. 2, the thermostatic switch 5 is in "make" position, current now flows from terminal 3 (phase) via conduit 12 through the thermostatic switch 5 through one of the terminals of lamp 6, through the lamp 6, wire 10 to terminal 2 (zero). Thus the lamp 6 is lighted up indicating that the water in the boiler is insufficiently hot.

Thus the householder may either wait until the water is heated (during daylight) by solar irradiation or switch on the current at switch 1, thus establishing a closed circuit.

Figure 3:
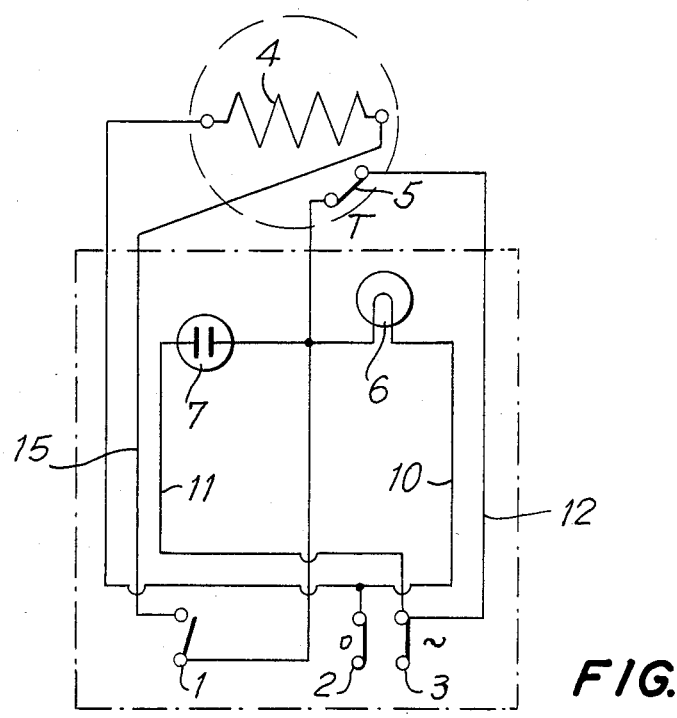

The embodiment of FIG. 3 introduces a further feature into the new wiring system, without departing from the gist of the invention. In the embodiment of FIGS. 1 and 2 the heating resistance is permanently connected to phase. This might constitute an objectionable matter and in order to follow also rules which would not tolerate such permanent connection, an additional lead 15 connects phase of the resistance 4 with the main interruptor switch 1. Thus whenever the switch 1 is open, the system is fully disconnected.

What is claimed is:

1. A heating arrangement comprising:
   first and second junctions connectable to a power source, a heating resistance having first and second terminals, a thermostatic control switch in series with the second terminal of the resistance, and
   two optical signals, one being an incandescent lamp and the second a gas filled glow lamp, each having first and second terminals and being arranged and positioned such that one terminal of the incandescent lamp is directly connected to the second terminal of said resistance, a connection from the first terminal of the incandescent lamp to the first terminal of the glow lamp, the second terminal of the incandescent lamp being connected to one of the junctions, a connection from the one of the junctions to the first terminal of the resistance, the second terminal of the glow lamp being connected to the other of said junctions and the other of said junctions being connected to the thermosttic switch, and a supplemental switch in series with said resistance and one of said functions.

* * * * *